United States Patent [19]

Cumming et al.

[11] 4,300,894
[45] Nov. 17, 1981

[54] METHOD OF MAKING L-SHAPED INFLATABLE RESTRAINT CUSHION

[75] Inventors: Richard J. Cumming, Warren; John DeBano, Roseville; Vincent F. Sajewski, Sterling Heights; John F. Zens, Algonac; William A. Gardella, Mt. Clemens, all of Mich.

[73] Assignee: General Motors Corporation, Detroit, Mich.

[21] Appl. No.: 99,871

[22] Filed: Dec. 3, 1979

[51] Int. Cl.³ .............................................. B60R 21/08
[52] U.S. Cl. ................................... 493/210; 280/729; 493/243; 493/931
[58] Field of Search .............. 280/729, 728, 732, 738; 93/35 PC, 35 R, 35 SB, 8 VB, 1 WZ; 493/212, 210, 267, 243, 918, 920, 931, 967

[56] References Cited

U.S. PATENT DOCUMENTS

| | | | |
|---|---|---|---|
| 3,412,771 | 11/1968 | Ralph | 93/35 PC |
| 3,768,830 | 10/1973 | Hass | 280/729 |
| 3,801,126 | 4/1974 | Knight et al. | 280/730 X |
| 3,810,654 | 5/1974 | DeBano, Jr. et al. | 280/150 AB |
| 4,006,918 | 2/1977 | MacFarland | 280/729 |
| 4,169,613 | 10/1979 | Barnett | 280/732 |

Primary Examiner—James F. Coan
Attorney, Agent, or Firm—Edward J. Biskup

[57] ABSTRACT

A method of making a restraint cushion which when inflated forms a generally horizontally orientated lower compartment connected to a vertically orientated upper compartment comprising the steps of providing upper and lower sheets of woven material joined together along a rear edge and the side edges, forming a pleated section in the upper sheet, connecting the parts of the pleated section together, joining the pleated section to the lower sheet to form a wall separating the first compartment from the second compartment, and forming at least one opening between the compartments to allow fluid to flow from the lower compartment to the upper compartment.

3 Claims, 24 Drawing Figures

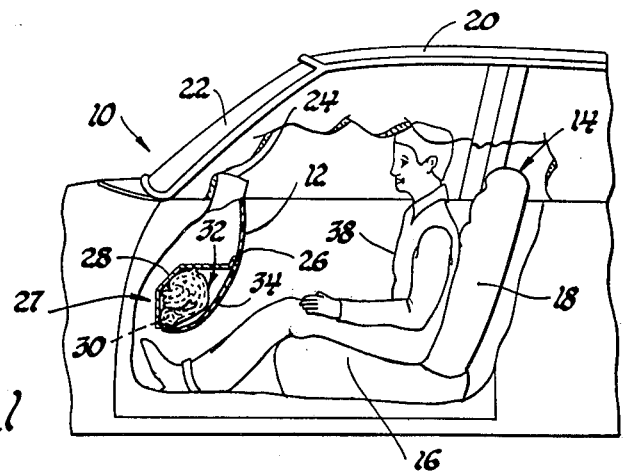
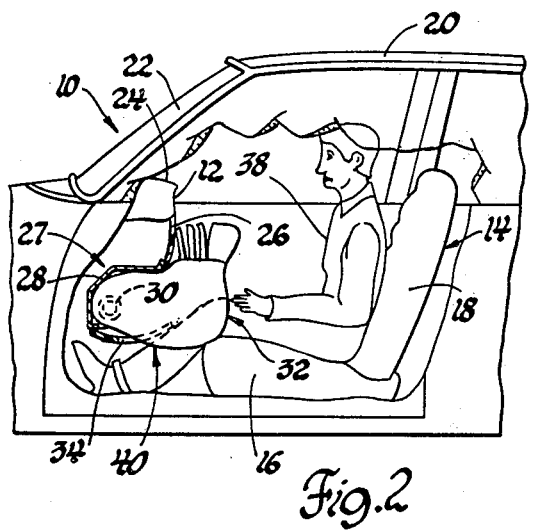
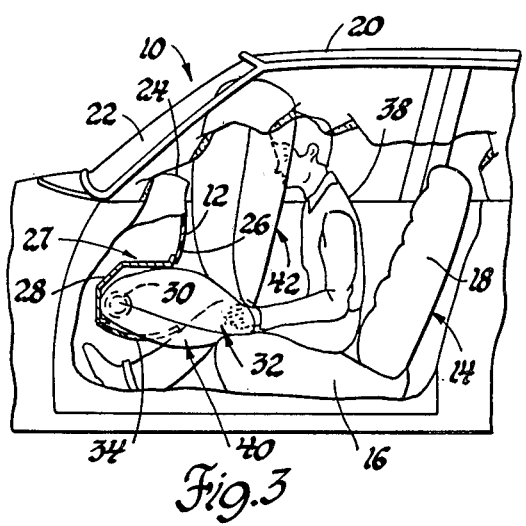
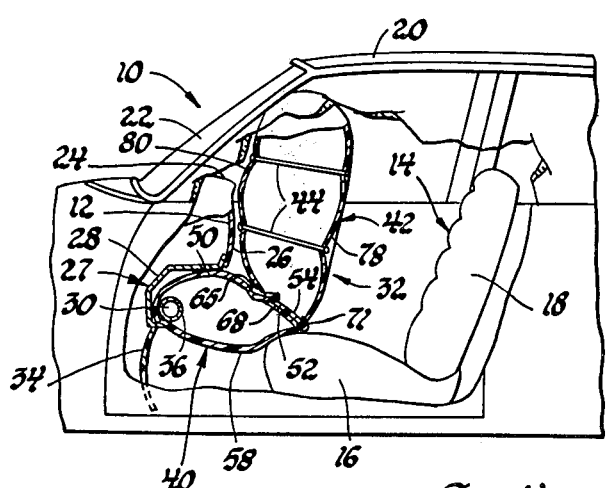

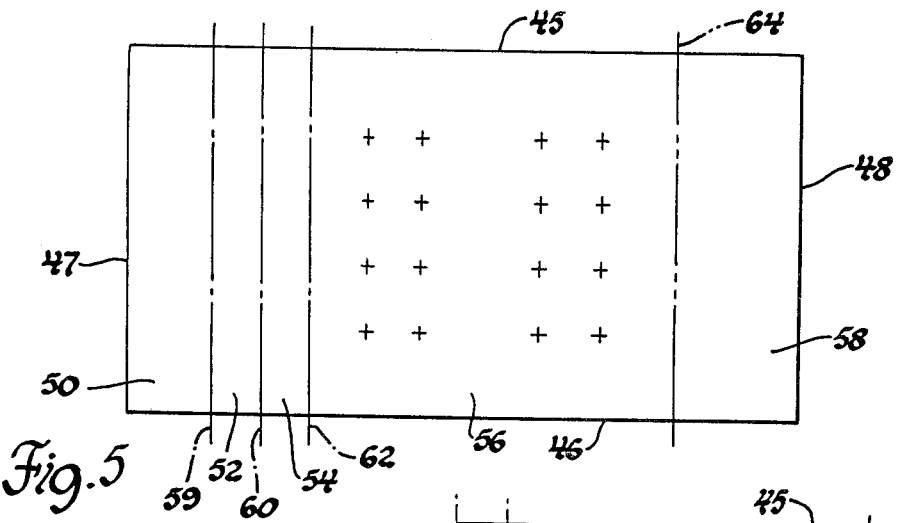
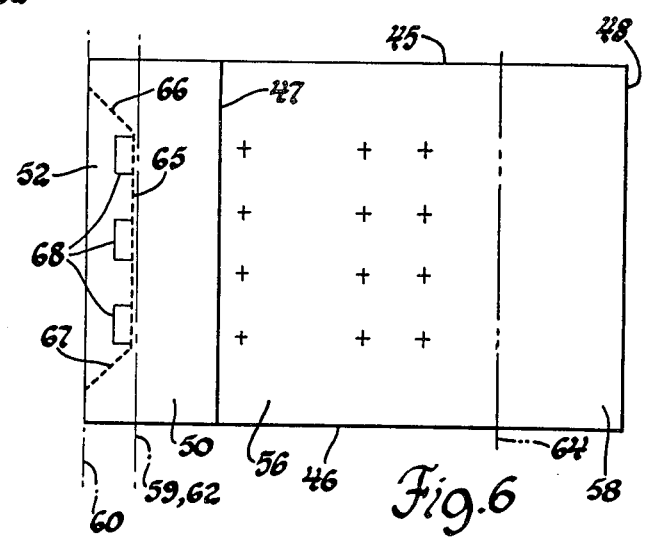
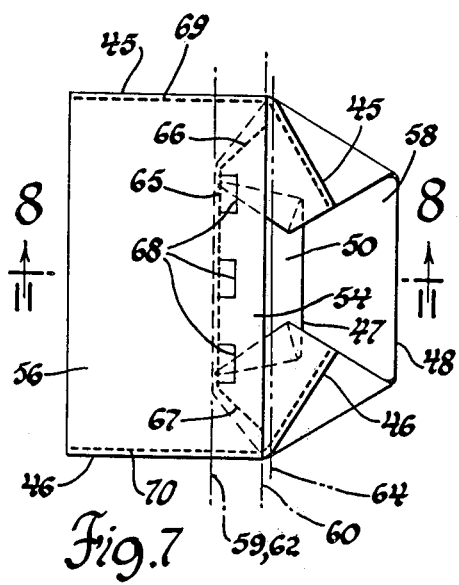
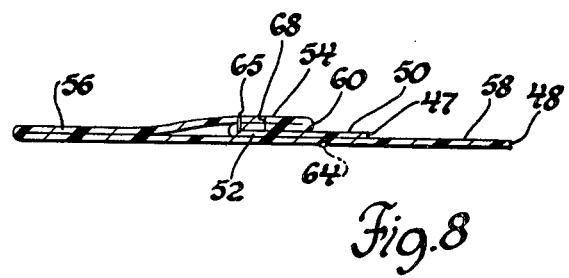
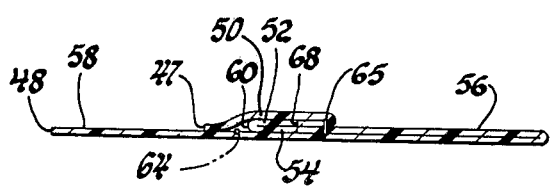
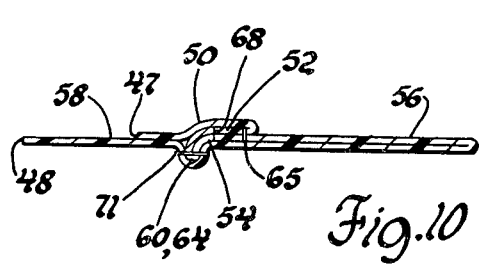

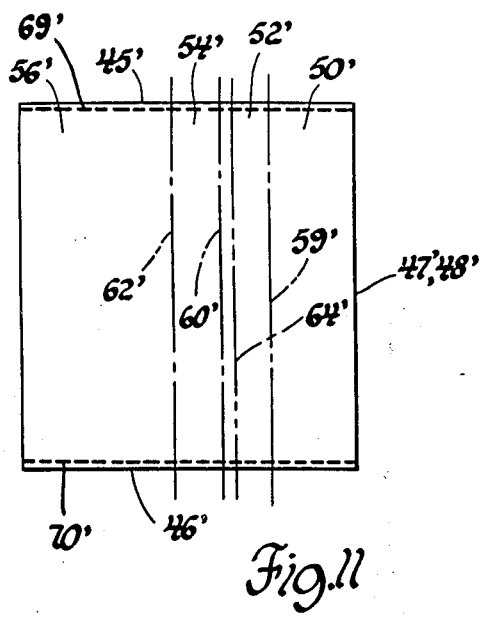
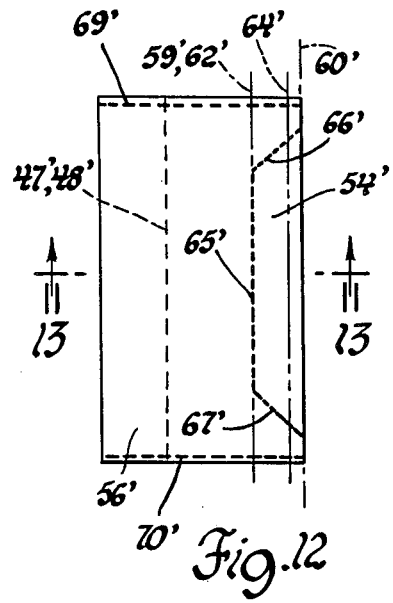
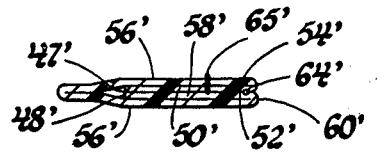
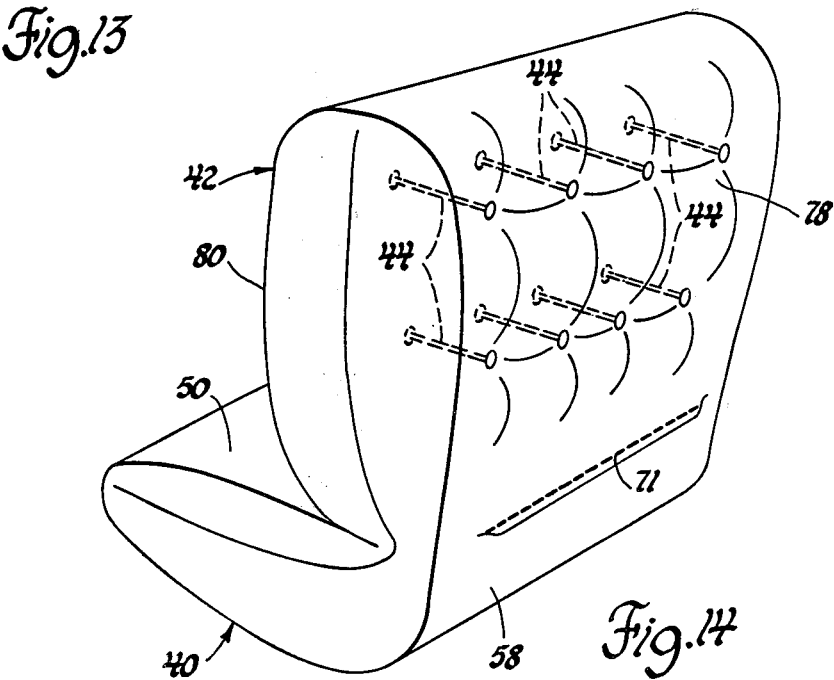

METHOD OF MAKING L-SHAPED INFLATABLE RESTRAINT CUSHION

This invention relates to inflatable restraint systems and more particularly concerns an inflatable restraint cushion adapted for use in a vehicle for restraining movement of a seated passenger during a collision.

More specifically, the present invention is directed to an inflatable restraint cushion that is compartmentalized into a lower compartment and an upper compartment that are interconnected and in constant communication with each other through a plurality of orifices located therebetween. The orifices are sized so as to control the flow of gases from the lower compartment to the upper compartment and insure that the lower compartment is substantially fully inflated prior to allowing any appreciable amount of gas to flow into the upper compartment. Moreover, the upper and lower compartments are arranged in an "L" configuration with the lower compartment extending rearwardly a distance which assures that it contacts the knees of the normally seated occupant while the dimension of the upper compartment in the fore-and-aft direction is limited by interconnecting the front and rear walls thereof so as to minimize the tendency of the cushion to envelop the occupant.

In the preferred form an inflatable restraint cushion made in accordance with the invention is located within a vehicle having a seat cushion and a seat back opposite a windshield and an instrument panel. The instrument panel is provided with a cavity formed in a lower portion thereof for storing the restraint cushion, which during deployment, assumes a configuration that limits engagement with a seated occupant. More specifically, the restraint cushion is formed from a woven material and includes a top wall and a bottom wall joined together so as to define a generally horizontally orientated lower compartment having a front end adapted to be attached to the gas generator and a rear end adapted to extend rearwardly sufficiently so when inflated it can contact the knee portion of the seated occupant and maintain the latter in the seat. The inflatable restraint cushion also includes a front wall and a rear wall formed of woven material that are joined together to form an upper compartment. The front and rear walls are connected to the top wall of the lower compartment in a manner that assures that the upper compartment is vertically orientated relative to the lower compartment and will cover the instrument panel and the windshield when inflated. Also, the upper and lower compartments communicate through at least one orifice formed in the top wall that allows gas to flow therethrough into the upper compartment. In addition, a plurality of cord-like members interconnect the front wall to the rear wall and serve to control the extent the rear wall moves relative to the front wall to thereby allow the torso of a properly seated occupant to move into the inflated cushion after a collision and permit the cushion to absorb the impact and minimize rebound.

Other features and advantages of the present invention will be apparent from the following detailed description when taken with the drawings in which:

FIG. 1 shows a 95th percentile male occupant seated in a vehicle incorporating an inflatable restraint cushion made in accordance with the present invention;

FIG. 2 shows the inflatable restraint cushion according to the present invention in the partially deployed position;

FIG. 3 shows the restraint cushion in the fully deployed position.

FIG. 4 is an sectional view showing the inflatable restraint cushion of FIG. 2 fully deployed and more clearly illustrates the construction of the cushion as well as the position it assumes relative to the various internal portions of a vehicle passenger compartment;

FIG. 5 is a plan view of a sheet of material used for making the inflatable restraint cushion of FIGS. 1-4 that assures the cushion will have the configuration of FIGS. 3 and 4 when fully deployed.

FIG. 6 is a view of the sheet of FIG. 5 after being folded at one end and sewn along a trapezoidal path;

FIG. 7 is a view showing another fold made in the sheet of FIG. 5, the side edges sewn together, and the front and rear walls marked for receiving the cords;

FIG. 8 is a cross-sectional view taken on line 8—8 of FIG. 7;

FIG. 9 is a view similar to that shown in FIG. 8 with the cushion turned inside out;

FIG. 10 is a view similar to FIG. 9 with the pleated section connected with the top sheet sewn to the bottom sheet of the cushion;

FIGS. 11 and 12 illustrate an alternate method of folding the sheet of FIG. 5 to realize the cushion configuration shown in FIGS. 3 and 4 when fully deployed;

FIG. 13 is a cross-sectional view taken on line 13—13 of FIG. 12;

FIG. 14 is a perspective view showing the completed cushion in the inflated state;

Figure 15:
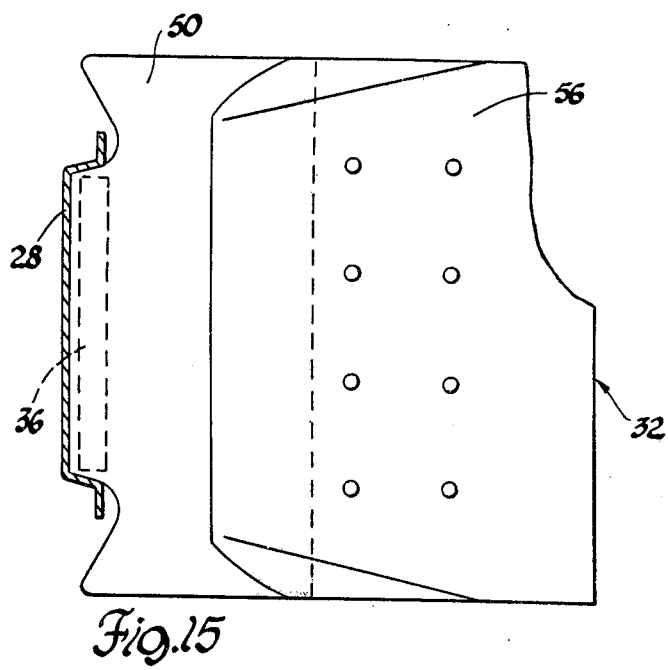
FIGS. 15-23 show the steps followed in folding the cushion for storage into the support housing.

Referring to the drawings and more particularly FIG. 1, a vehicle 10 is shown schematically including an instrument panel 12 positioned forwardly of a vehicle seat 14 consisting of a seat cushion 16 and a seat back 18. The front portion of the roof 20 of the vehicle 10 is attached to the usual windshield 22 that extends forwardly and terminates at the instrument panel 12 which includes an upper surface 24 facing the windshield 22 and a frontal surface 26. Mounted to the lower portion of the instrument panel 12 is an inflatable restraint system 27 which, as shown, includes a housing 28 provided with a cavity in which is located a gas generator or inflator 30 and an inflatable cushion 32 made according to the invention. A cover 34 normally closes the open front portion of the housing 28 and is adapted to swing downwardly upon deployment of the cushion 32 as seen in FIGS. 2 and 3. As is conventional, the gas generator 30 is concentrically positioned within a diffuser 36 which extends generally transversely of the vehicle. A suitable sensor (not shown) furnishes a signal under predetermined conditions and causes the gas generator 30 to be activated to inflate the cushion 32. When the cushion 32 is fully inflated by the pressurized gas, it assumes the configuration shown in FIGS. 3 and 4 to cover the instrument panel 12 and the windshield 22 so as to provide a restraint limiting the forward movement of a seated occupant 38.

More specifically, the cushion 32, according to this invention, assumes a L-shaped configuration when inflated, consisting of a lower compartment 40 that is generally horizontally orientated and an upstanding upper compartment 42 which is located in a generally vertically orientated position relative to the lower compartment 40. The cushion 32 is designed so that the lower compartment 40 is substantially fully inflated prior to allowing an appreciable amount of gas to flow into the upper compartment 42. As a result, during the initial inflation of the restraint cushion 32, as seen in FIG. 2, the lower compartment 40 will engage the knees of the occupant 38 and press the latter rearwardly towards the seat back 18 and afterwards the upper compartment 42 deploys substantially vertically upwardly as seen in FIG. 3 for receiving the impact of the occupant's torso.

As seen in FIG. 4, the upper compartment 42 includes constraining means in the form of a plurality of cords 44 which limit the fore-and-aft dimension of the upper compartment so that the latter does not tend to envelop the occupant 38. The fore-and-aft dimension of the upper compartment 42, of course, is sufficient to absorb impact of the occupant 38 and minimize rebound in the event of a collision.

As seen in FIGS. 5-10, the cushion 32 described above, is preferably made from a single sheet of generally rectangular porous woven material such as Dacron or Nylon. As seen in FIG. 5, the sheet is defined by parallel side edges 45 and 46 and parallel ends 47 and 48. Initially, the sheet is divided into five sections 50, 52, 54, 56, 58 by straight lines such as indicated by the imaginary lines 59, 60, 62 and 64 each of which is perpendicular to side edges 45 and 46 and marked on the sheet. In addition, the sheet is marked with two rows of four crosses adjacent to section 54 and two rows of four crosses adjacent to section 58. Each row of four crosses is located along a straight line which is perpendicular to the side edges 45 and 46. It will be noted that sections 52 and 54 are equal in size while section 58 is somewhat larger than section 50. Section 56 is about four times as large as section 58. The end 47 is first folded towards end 48 so as to position the imaginary line 59 directly over imaginary line 62 as seen in FIG. 6. This is followed by sewing sections 52 and 54 together along a trapozoidal path which includes a stitch line 65 (located along the superimposed imaginary lines 59, 62) and stitch lines 66 and 67 which start at the fold along imaginary line 60 and connect with the stitch line 65. As should be apparent, the stitch lines 66 and 67, if extended, would intersect at the longitudinal center axis of the sheet. One or more orifices in the form of U-shaped slits 68, are then made in the abutting sections 52 and 54. Afterwards, the end 47 is pulled to the right into alignment with end 48 and the top sheet is sewn to the bottom sheet along the aligned side edges 45 and 46 by stitch lines 69 and 70 as seen in FIG. 7. In this regard, it will be noted that inasmuch as the sections 52 and 54 are sewn together as aforedescribed, the latter sections form a pleat in the sheet. However, as the side edges 45 and 46 of the sheet are sewn together by the stitch lines 69 and 70, the pleat is opened so that along the entire length of each side edge, only two overlaying sheets of material are sewn together. Because of this, the various portions of the cushion at this stage assume positions as shown in FIGS. 7 and 8. The cushion is then turned inside out so that it assumes the configuration shown in FIG. 10 with the pleat located within the confines of the cushion. This is then followed by attaching the free end of the pleat to the lower sheet. As to the latter, the end of the pleat along imaginary line 60 and between stitch lines 66 and 67 is sewn to the lower sheet along imaginary line 64 by the stitch line 71. The cords 44 are then connected between each pair of opposed crosses as seen in FIGS. 4 and 14. A sufficient number of cords 44 are utilized to provide the constraining action that assures that the upper compartment 42 of the cushion 32 is narrow in the fore-and aft direction as seen in FIG. 4.

Another method of forming the cushion 32 is shown in FIGS. 11-13. In this instance, one would again start with a blank sheet such as shown in FIG. 5. However, rather than making a fold about imaginary line 60 as aforedescribed, the end 47 would be moved to the right into alignment with end 48. This is shown in FIG. 11 wherein the same numerals but primed are used to identify corresponding stitches and portions of the sheet. The upper and lower sheets would then be drawn taut and sewn by stitch lines 69' and 70' located respectively adjacent side edges 45' and 46'. The aligned ends 47' and 48' are then tucked inside the cushion so that the imaginary line 60' forms the right hand edge of the cushion as seen in FIGS. 12 and 13. The sections 52' and 54' are then sewn together by a stitch line 65' along aligned imaginary lines 59' and 62' and by stitch lines 66' and 67' which, as in the case with stitch lines 66 and 67, start at imaginary line 60' adjacent the side edges and when extended intersect at the longitudinal center axis of the sheet. Afterwards, the ends 47' and 48' are pulled out of the enterior of the cushion so that the latter then assumes the configuration shown in FIG. 8. From this point on, the steps necessary to complete the forming of the cushion 22 are identical to those described in connection with the method illustrated in FIGS. 5-10.

After the cushion 32 is formed as described above, the edges 47 and 48 or 47' and 48' of the upper and lower sheets respectively are once again aligned and are sewn together. The side of the cushion adjacent the connected edges 47 and 48 is slit, and the cushion is then combined with the gas generator-diffuser combination in the usual manner and afterwards placed within the housing 28. The cushion 32 is then top pleated in a manner as shown in FIGS. 15 through 23 for storage in the housing 28 prior to mounting to the instrument panel of the vehicle.

Figure 18:
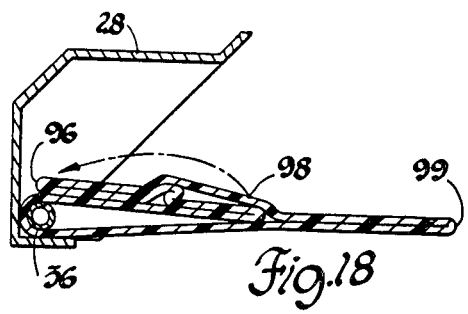
Figure 19:
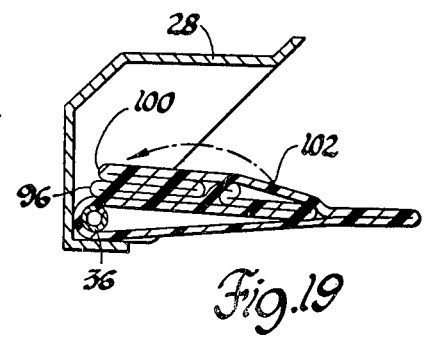
Figure 16:
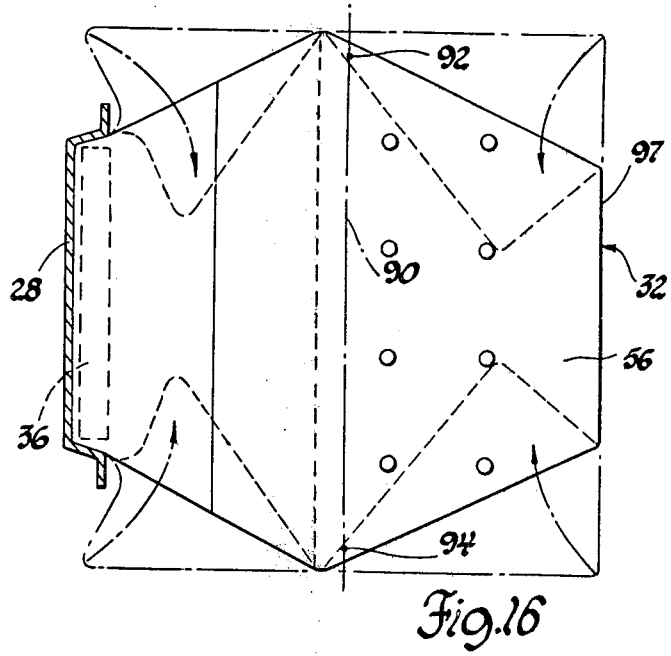
Figure 20:
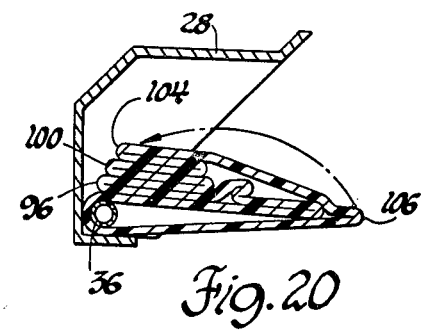
Figure 17:
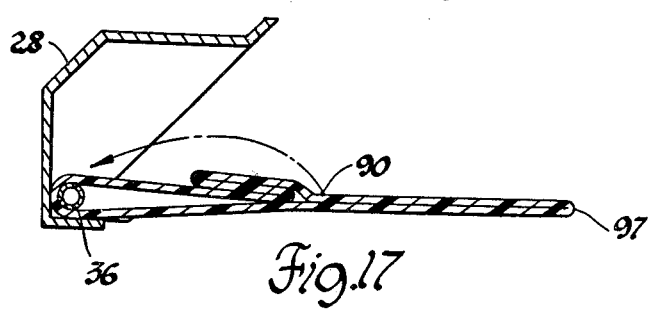
Figure 21:
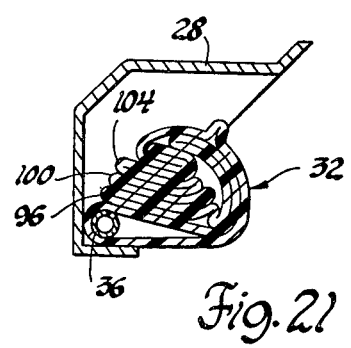
Figure 22:
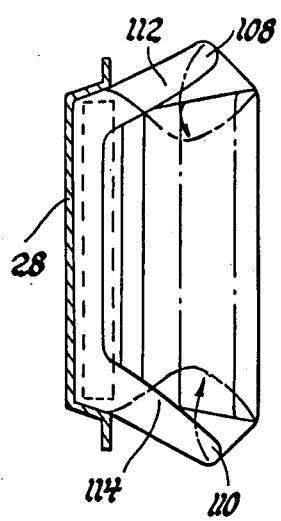
Figure 23:
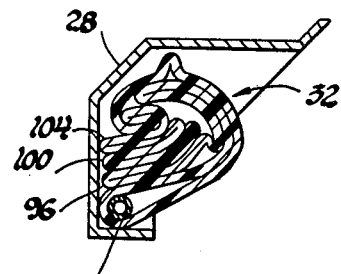
Figure 24:
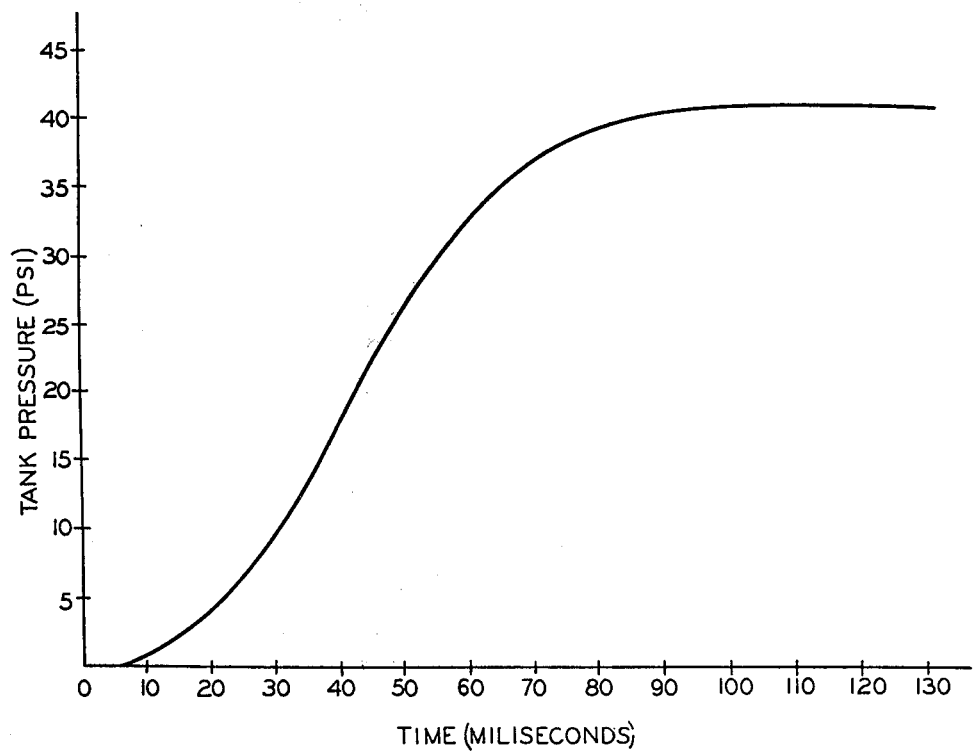
FIG. 24 shows a performance curve of a gas generator used with one cushion made according to the present invention.

In this connection, it will be noted that as seen in FIG. 16, the corners of the cushion 32 are first tucked inwardly so that the four corners are located between the upper and lower sheets of the cushion. Afterwards and as seen in FIGS. 16 and 17, the top material along the imaginary line 90 and at the points 92 and 94 is grasped and moved to the left to form a first pleat 96 as seen in FIG. 18. The imaginary line 90 is located approximately midway between the vertical center of the gas generator and the right hand edge 97 of the cushion. This is followed by again grasping the top part of the cushion adjacent the side edges thereof, and along a transverse imaginary line 98 located approximately midway between the vertical center of the gas generator and the right hand edge 99, as seen in FIG. 18, and moving it to the left to form a second pleat 100. The midway portion of the top part of the cushion along a transverse line as indicated by reference numeral 102 in FIG. 19 is then grasped in the same manner and moved forward to form the pleat 104. At this point, the distance from the vertical center of the gas generator to the tail end 106 of the cushion is slightly greater than the full opening of the cavity in the housing 28 measured along a substantially vertical axis. At this time, the tail end 106 is folded onto the pleats 96, 100 and 104 as seen in FIG. 21. Afterwards, the side portions 108 and 110 are tucked into pockets 112 and 114, respectively, located adjacent pleat 104 as seen in FIG. 22 so that side portions assume the phantom line positions shown. The entire cushion unit is then rotated into the housing 28 as seen in FIG. 21 to complete the folding and storage operation, as seen in FIG. 23. A clear sheet of polyethylene is then wrapped around the housing 28 to retain the cushion 32 in the housing 28 for subsequent mounting to the instrument panel of the vehicle.

When the cushion 32 described above is inflated, it assumes the configuration of FIGS. 3, 4 and 14 with the lower compartment 40 having a top wall consisting of sections 50, 52 and 54 and a bottom wall consisting of section 58 sewn together at the lateral spaced side edges thereof. The ends 47 and 48 of the top and bottom walls are rigidly and sealingly connected to the gas generator 30. As seen, the bottom wall extends rearwardly in the direction of the frontal portion of the seat cushion 16 after which it bends upwardly and is integrally formed with a rear wall 78 and a front wall 80 both of which are a part of section 56 and together define the upper compartment 42. Both the front wall 80 and rear wall 78 are rigidly connected with the top wall in a manner as hereinbefore described to assure that the upper compartment 42 will assume the vertically orientated position shown when inflated. Also as aforementioned, the slits 68 form orifices in the top wall so as to provide a continuous gas connection between the lower and upper compartments 40 and 42. Also, the cords 44 help insure that the front and rear walls stay substantially vertically orientated relative to the lower compartment 40. In other words, the extent that the rear wall 78 moves relative to the front wall 80, is controlled so that enveloping engagement with an occupant can be minimized.

One restraint cushion 32 made according to the invention that was successfully tested was made from a sheet of 100 percent nylon woven fabric having a permeability reading of 3.5–10 CFM/ft$^2$ at 0.5 in H$_2$O pressure on the Frazier Tester. As seen in FIG. 5, the longitudinal length of the cushion prior to the sewing steps shown in FIGS. 6–10 was approximately 121 inches as measured from the edge 47 to edge 48 and had a width of approximately 56 inches. The distance measured along the longitudinal axis of the sheets seen in FIG. 5 from edge 47 to line 59 was 14 inches, from edge 47 to line 60 was 22 inches, from edge 47 to line 62 was 30 inches, and from edge 47 to line 64 was 90 inches. Stitch 65 was centered between side edges 45 and 46 and measured 41 inches. The stitches 66 and 67 each started at a point 14 inches from the associated side edge along line 60. Eight cords 44 were used and each cord was 10 inches in length. The cords 44 were placed in two rows with the distance from section 50, as seen in FIG. 4, to the lower row of cords measuring approximately 8.5 inches and the distance from section 50 to the upper row of cords measuring approximately 17 inches. Three U-shaped slits 78 were placed through sections 52 and 54 and each had a base cut measuring 4 inches and a pair of leg cuts measuring 2 inches each leg. The gas generator utilized with the cushion 32 was made by Wasatch Division of Thiokol Corporation located in Brigham City, Utah, and was capable of producing a Tank Pressure vs. Time curve as shown in FIG. 22, when fired at a room temperature of approximately 70° F. in a closed steel test chamber that was cylindrically shaped and had an interior volume measuring 0.3 cubic meters. The diffuser had thirty-two openings for the gas flow into the cushion. The openings were aligned along an axis extending longitudinally of the diffuser and located in four equally spaced groups with each group consisting of eight openings. Each opening took the form of a vertically orientated slot measuring 3.5 millimeters by 40 millimeters. In addition, the gas flowed through three circular apertures each of which had a diameter that measured 20 millimeters. One of the apertures was located between each adjacent group of openings.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A method of making a restraint cushion which when inflated forms a generally horizontally orientated lower compartment having top and bottom walls connected to a vertically orientated upper compartment having front and rear walls, said method comprising the steps of:
    (a) providing upper and lower sheets of flexible material which are joined together along a rear edge and the two side edges;
    (b) forming a pleated section in said upper sheet along an axis extending transversely to said side edges;
    (c) connecting the parts of said pleated section together, starting adjacent one side edge and ending adjacent the other side edge;
    (d) joining said pleated section to said lower sheet so that said pleated section forms a wall between said lower compartment and said upper compartment;
    (e) providing at least one opening between said upper and lower compartments for allowing gas to flow from said lower compartment to said upper compartment; and
    (f) joining said front and rear walls of said upper compartment so as to limit the extent said front and rear walls move relative to each other when said upper compartment is inflated.

2. A method of making a restraint cushion which when inflated forms a generally horizontally orientated lower compartment having top and bottom walls connected to a vertically orientated upper compartment having front and rear walls, said method comprising the steps of:
    (a) providing upper and lower sheets of flexible material which are joined together along a rear edge and the two side edges;
    (b) forming a pleated section in said upper sheet along an axis extending transversely to said side edges;
    (c) connecting the parts of said pleated section together, starting adjacent one side edge and ending adjacent the other side edge;
    (d) joining said pleated section to said lower sheet so that said pleated section forms a wall between said lower compartment and said upper compartment;
    (e) forming at least one opening in said pleated section for allowing gas to flow from said lower compartment to said upper compartment; and
    (f) joining said front and rear walls of said upper compartment so as to limit the extent said front and rear walls move relative to each other when said upper compartment is inflated.

3. A method of making a restraint cushion which when inflated forms a generally horizontally orientated lower compartment having top and bottom walls connected to a vertically orientated upper compartment having front and rear walls, said method comprising the steps of:
 (a) providing an elongated rectangular sheet of flexible material having parallel side edges and parallel ends;
 (b) folding said sheet so that said ends are aligned and joining said sheet together along the side edges thereof so as to form overlying upper and lower sheets;
 (c) forming a pleated section in said upper sheet along an axis extending transversely to said side edges;
 (d) connecting the parts of said pleated section together along a generally trapezoidal path starting adjacent one side edge and ending adjacent the other side edge;
 (e) connecting said pleated section to said lower sheet to form a wall between said lower compartment and said upper compartment;
 (f) forming at least one opening in said pleated section for allowing gas to flow between said upper and lower compartments; and
 (g) joining said front and rear walls of said upper compartment so as to limit the extent said front and rear walls move relative to each other when said upper compartment is inflated.

* * * * *